(12) United States Patent
Sharma et al.

(10) Patent No.: US 9,633,074 B1
(45) Date of Patent: Apr. 25, 2017

(54) QUERYING DATA SET TABLES IN A NON-TRANSACTIONAL DATABASE

(71) Applicant: Amazon Technologies, Inc., Reno, NV (US)

(72) Inventors: Raghvendra Sharma, Rajasthan (IN); Sachin Kumar Goel, Shahdara (IN); Gautam Venkatesh Murti, Fremont, WA (US); Tushant, Uttar Pradesh (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 276 days.

(21) Appl. No.: 14/147,282

(22) Filed: Jan. 3, 2014

(51) Int. Cl.
*G06F 17/30* (2006.01)
(52) U.S. Cl.
CPC .............................. *G06F 17/30442* (2013.01)
(58) Field of Classification Search
CPC ..................... G06F 17/30979; G06F 17/30442
See application file for complete search history.

(56) References Cited

U.S. PATENT DOCUMENTS

| | | | |
|---|---|---|---|
| 9,092,502 B1* | 7/2015 | Cannaliato | G06F 17/30595 |
| 2012/0330954 A1* | 12/2012 | Sivasubramanian | G06F 9/5061 |
| | | | 707/737 |
| 2014/0149400 A1* | 5/2014 | Fu | G06F 17/30979 |
| | | | 707/723 |
| 2014/0344236 A1* | 11/2014 | Xiao | G06F 17/30368 |
| | | | 707/696 |
| 2015/0052114 A1* | 2/2015 | Curewitz | G06F 17/30519 |
| | | | 707/722 |

OTHER PUBLICATIONS

Werner Vogels "Expanding the Cloud: Faster, More Flexible Queries with DynamoDB", Apr. 17, 2013.*

* cited by examiner

*Primary Examiner* — Etienne Leroux
*Assistant Examiner* — Cindy Nguyen
(74) *Attorney, Agent, or Firm* — Davis Wright Tremaine LLP

(57) ABSTRACT

A method and apparatus for facilitating data set query is disclosed. In the method and apparatus one or more tables may be created for the data set, whereby each table of the one or more tables may enable searching the data set using one or more records that are associated with one or more indices of the data set. Upon receiving a request to search the data set, a table of the one or more table is identified based at least in part on the one or more bases for query and is searched to provide a yielded record.

20 Claims, 9 Drawing Sheets

QUERYING DATA SET TABLES IN A NON-TRANSACTIONAL DATABASE

BACKGROUND

Database systems have popular applications in many fields including the Internet and electronic commerce spaces. In many applications, database systems are used to maintain important information about products, customers and the like. Further, with the growth of Internet and e-commerce applications, among others, it is becoming increasingly necessary for database systems to be able to handle ever-growing data sets. It is also becoming increasingly important for database systems to be capable of providing features such as the ability to perform expedient data queries and the ability to provide a large data throughput. However, as the size of data sets maintained by the database systems increases, certain database systems may not be optimally scaled and may incur performance penalties. Further, as the size of data sets increases, the throughput achieved by some database system decreases and the computational cost of performing data queries, data updates and other operation increases.

Accordingly, it is challenging to provide a robust query capability on a large set of data. It is also challenging to enable updating records of a set of data while ensuring that conflicts between the records are avoided.

BRIEF DESCRIPTION OF THE DRAWINGS

Various embodiments in accordance with the present disclosure will be described with reference to the drawings, in which.

DETAILED DESCRIPTION

Figure 1:
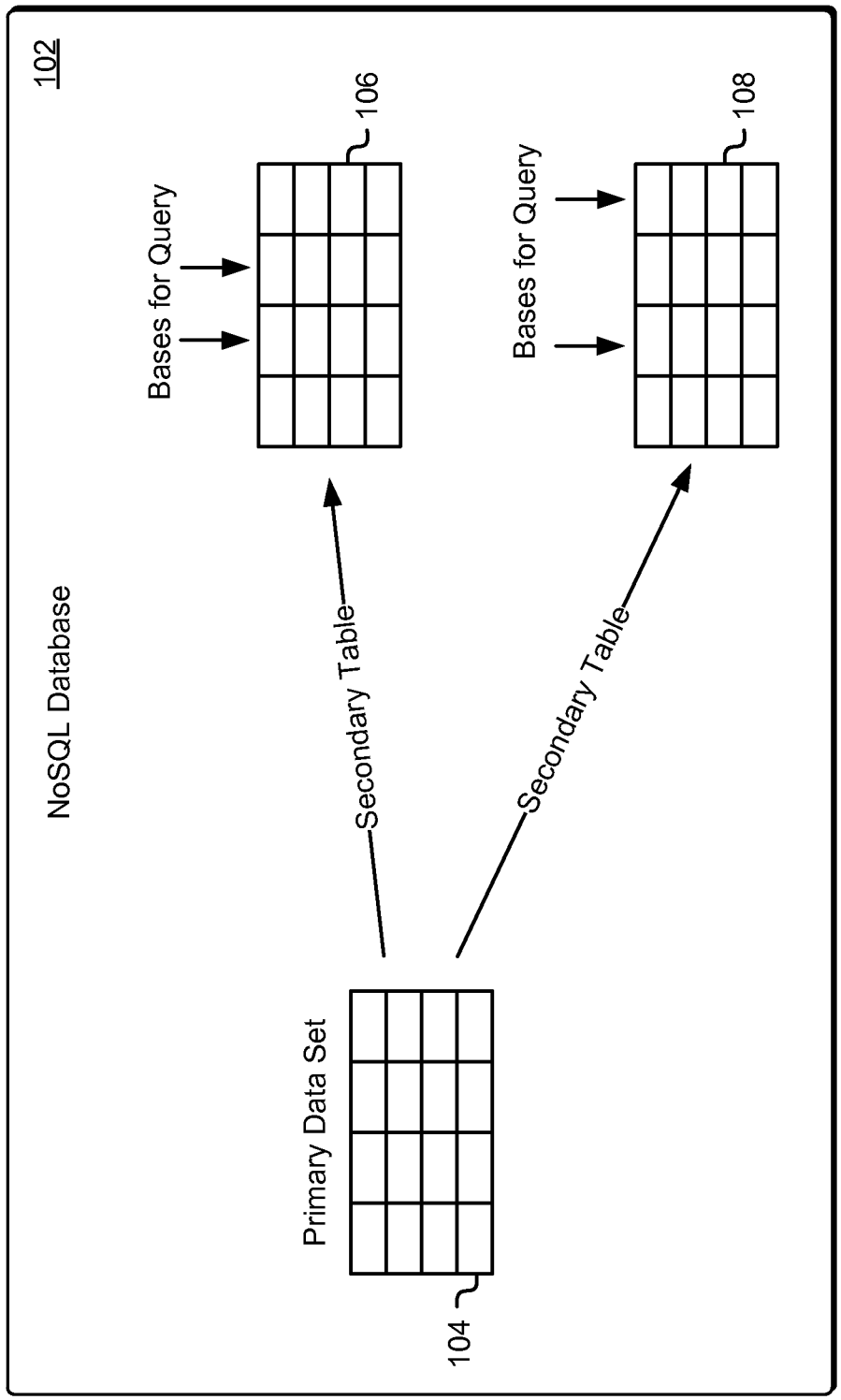
FIG. 1 shows an example of enabling data set queries using a NoSQL database in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include facilitating the searching of a data set based at least in part on one or more indices of the data set. A data set may include a plurality of records, whereby the plurality of records may be organized according to a plurality of indices and each record of the plurality of records may belong to an index of the plurality of indices. As described herein, an index may be a column of the data set or a data field of the data set. The data set may have a pre-specified schema whereby each row of the data set may have a corresponding value that populates each index of the plurality of indices. However, in alternative embodiments, the data set may be schema-less, whereby it may not be required for each index of the data set to be populated for each row. For example, in a schema-less data set, one row may have corresponding records in a first set of indices, whereas another row may have corresponding records in a second set of indices. The first set of indices and the second set of indices may or may not overlap.

The data set may be sought to be queried based at least in part on a plurality of bases for query. The data set (also referred to herein as a primary data set or a primary table) may be stored in a data base. A basis for query may be an index of the data set utilized to query one or more other indices of the data set. When a data set is queried using one basis for query, a data set record or a range of data set records (for example, values expected to be found in one data set column) are provided to form the basis for query and rows having a matching record are provided as a query result.

When the data set is retained in a table of a transactional database, the transactional database may offer elaborate query capabilities. For example, the transactional database may enable querying the data set by providing three data records or ranges of records, whereby each record may belong to a different index of the data set. As a result of the query, all data set rows whose corresponding indices have records that match the queried records are provided. Although transactional databases provide greater flexibility with respect to query options, the transactional databases are computationally expensive and may not be optimally scaled as the size of the data set increases. As the size of the data set increases, the throughput provided by the transactional databases decreases. Conversely, a non-transactional database, such as a NoSQL database, may offer greater scalability as the size of the data set increases at the expense of more complex query functionality.

A non-transactional database table may enable queries to be performed based at least in part on two bases for query. Each non-transactional database table may have a primary key comprising a hash key and a range key and any two indices of a data set may be designated as the hash key and the range key. The remaining indices of the table may be designated as a secondary index. The table may be queried by providing a value or a range of values for the hash key and a value or a range of values for the range key. The result of the query may be the remaining indices designated as a secondary index.

To enable a primary data set to become searchable based at least in part on more than two bases for query, two or more tables may be persisted for the primary data set in a non-transactional database. A persisted table (also referred to herein as a secondary table) may be persisted by storing entries of the primary data set in a non-transactional database, whereby the entries may be populate rows of the table. Accordingly, the table may be maintained in the database, and searches may be performed on the table. Each persisted table may be searched based at least in part on two bases for query. Accordingly, by constructing more than one table for the primary data set added query flexibility may be attained. Further, the two bases for query for the tables may be different or may have a basis for query in common. It is noted that when a succession of queries is performed on the various tables of the primary data set, a multi-indexed query may be achieved as provided, for example, by a transactional database.

In some embodiments, a contract between a buyer and a seller may be recorded in primary data set, whereby to record the contract, the primary data set may include an index for a buyer ID or a seller ID, an index for a contract ID, an index for a creation time associated with the contract, an index for a time on which the contract is updated, an index for a status of the contract and an index for the type of the contract. To cause the primary data set to be searchable for a contract identity based at least in part on the buyer ID and the creation time, a table of the data set may be persisted in the non-transactional database and the index for the buyer ID may be designated as a hash key and the index for the creation time may be designated as the range key. Further, to cause the data set to be searchable for a contract identity based at least in part on the buyer ID and the update time, a second table of the data set may be persisted in the non-transactional database and the index for the buyer ID may be designated as a hash key and the index for the update time may be designated as the range key. Similarly, additional tables may be persisted to facilitate other types of queries.

Upon receiving a request to query the data set, the request may be processed to determine the one or more bases for query associated with the request. For example, if the request for query specifies a buyer ID and a creation time for a contract and requires the contract identity as a query outcome, the first created table may be queried due to the fact that the first created table is capable of facilitating searching the data set on the basis of buyer ID and creation time.

FIG. 1 shows an example of enabling data set queries using a NoSQL database in accordance with at least one embodiment. A data set 104, which may be populated by a plurality of records belonging to a plurality of indices, is stored in a NoSQL database 102. Further, two tables 106, 108 for the primary data set 104 are persisted in tables in the NoSQL database 102. The two tables 106, 108 are persisted in the NoSQL database 102 in order to facilitate queries based at least in part on one or more bases for query. As persisted in the first table 106, the data set may be searched using two bases for query, whereby each basis for query corresponds to an index of the data set 104. Similarly, as persisted in the second table 108, the data set 104 may be queried using two bases for query. In the illustrative example of FIG. 1, the bases for query of the first table 106 are the second and third indices of the four indices of the data set 104, whereas the bases for query of the second table 108 are the second and fourth indices. By creating two tables for the data set 104 in the database service 102, the data set 104 may be flexibly queried based on a variety on indices. For example, utilizing the first table 106 records belonging to the first index and fourth index may be queried based at least in part on records belonging to the second and third indices. Further, utilizing the second table 108 records belonging to the first index and third index may be queried based at least in part on records belonging to the second and fourth indices.

Figure 2:
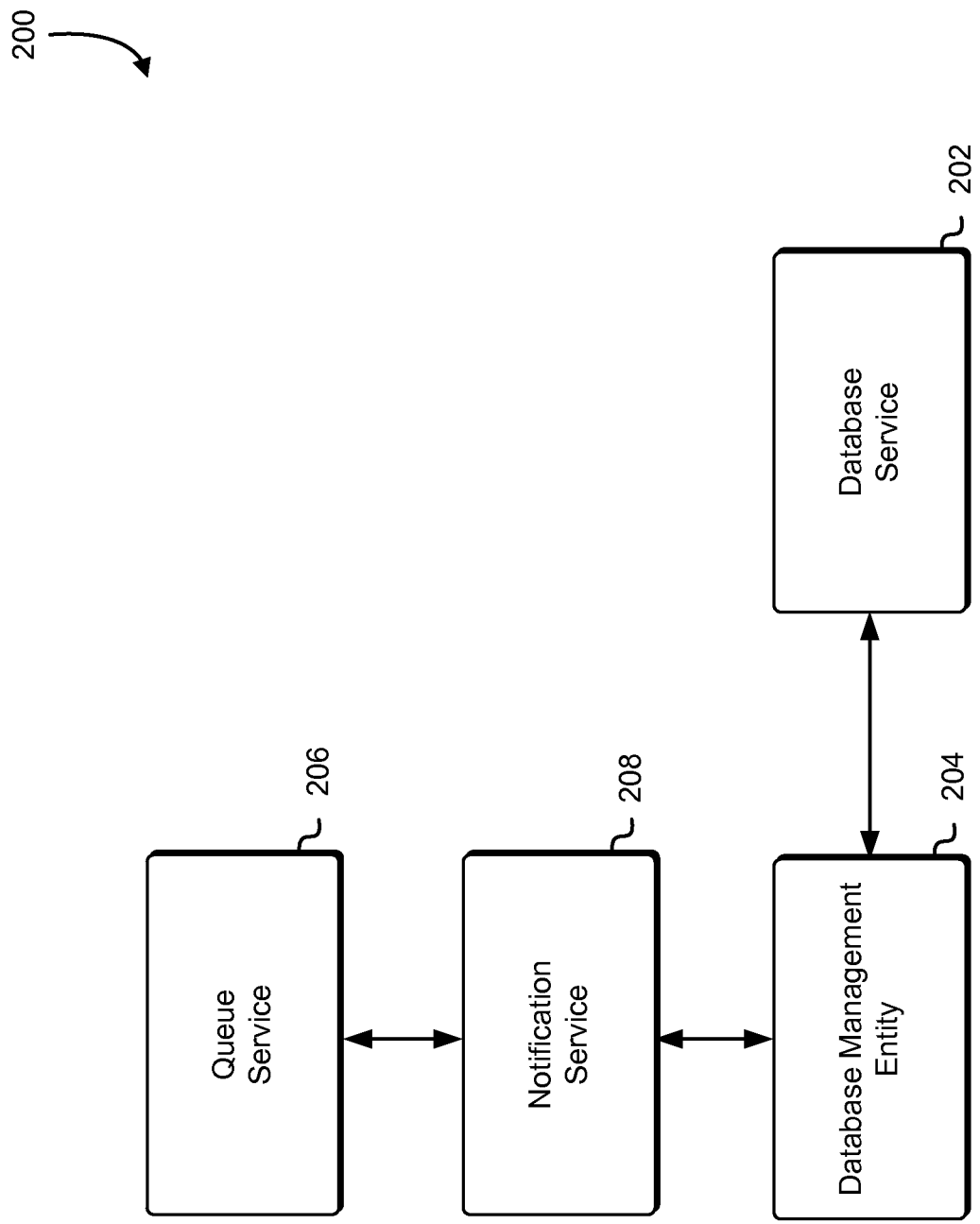
FIG. 2 shows an example of environment for managing a data set in a database service in accordance with at least one embodiment.

FIG. 2 shows an example of environment for managing a data set in a database service in accordance with at least one embodiment. In the environment 200, a database management entity 204 communicates with a database service 202. The database management entity 204 may comprise a collection of computing resources collectively configured to operate and manage a table maintained by the database service 202. For example, the database management entity 204 may be at least one computing device that is configured to transmit commands to the database service 202 to operate and manage a table maintained by the database service 202. The table may include a plurality of records of a data set and the database management entity 204 may cause the table to be stored in the database service 202. The database management entity 204 may further specify the bases for query and secondary indices associated with the table. The database management entity 204 may also initiate performing queries on the table, for example, by providing one or more records associated with one or more bases of query for the table and enable providing query results to a requesting party. In addition, the database management entity 204 may enable modifying or updating one or more records maintained in the table.

The database service 202 may comprise a collection of computing resources collectively configured to persist one or more tables and cause the one or more tables to be searchable. For example, the database service 202 may be at least one computing device that is configured to receive commands from the database management entity 204 and operate to maintain the one or more tables in accordance with the received commands. The database service 202 may receive appropriately configured API calls specifying actions to be performed on the one or more tables, such as persisting a database table and modifying the table as desired. The tables may have any number of attributes and may or may not have a fixed schema. In addition, the database tables may be non-relational or NoSQL tables. Further, the database service 202 may support records of any data type including, but not limited to, strings, numbers, binary data and sets.

In the environment illustrated in FIG. 2, a queue service 206 is included. The queue service 206 may comprise a collection of computing resources collectively configured to provide one or more queues for transmitting notifications, tasks, events, messages or data. For example, the queue service 206 may be at least one computing device that is configured to retain notifications, tasks, events, messages or data for a pre-specified amount of time. The queue service 206 may receive a notification from a notification service of a task that is sought to be performed on a table maintained by the database service 202. The queue service 206 may place the notification in a queue. As described herein, the tasks may include modifying an entry of a primary data set that is persisted in the database service 202 or one or more secondary tables that are persisted in the database service 202. As described herein, after the notification is added to the queue, the notification may be received by the database management entity 204, which may in turn, cause the execution of the task. After execution, the notification may be removed from the queue. The queue service 206 may enable data locking, whereby after a notification is pulled from the queue, the notification may be deemed as locked and may become inaccessible to prevent duplicate execution of the tasks.

In the environment illustrated in FIG. 2, a notification service 208 is included. The notification service 208 may comprise a collection of computing resources collectively configured to provide to configure topics for which the database service 202 seeks to be notified. For example, the notification service 208 may be at least one computing device that is configured to cause the database management entity 204 to be notified when a task for execution is received. The notification service 208 may cause the delivery of the messages any protocol (for example, hypertext transfer protocol (HTTP), e-mail and short message service (SMS), among others). The notification service 208 may provide notifications using a "push" mechanism without the need to periodically check or "poll" for new information and updates.

For example, a primary data set that is stored in the database service 202 may have one or more associated secondary tables that are also stored in the database service 202 to facilitate performing a query on the data set. If a task, such as modifying or adding an entry to the data set is sought to be performed, a notification is issued to the database management entity 204. The notification may be queued in a queue of the queue service 206, whereby the database management entity 204 may retrieve the notification. Further, in accordance with the notification, the primary data set may update the primary data set. After the primary data set is updated, a second notification may be issued, for example, by the notification service 208 to update the one or more associated secondary tables in accordance with the update perform on the primary data set. The second notification may also be queued (for example, in the same queue as the prior notification) and may be retrieved by the Using a similar the one or more form the queue and cause the primary data set to may be retrieved by the database management entity 204 from the queue. After retrieval, the database management entity 204 causes the one or more secondary tables maintained by the database service 202 to be updated.

Figure 3:
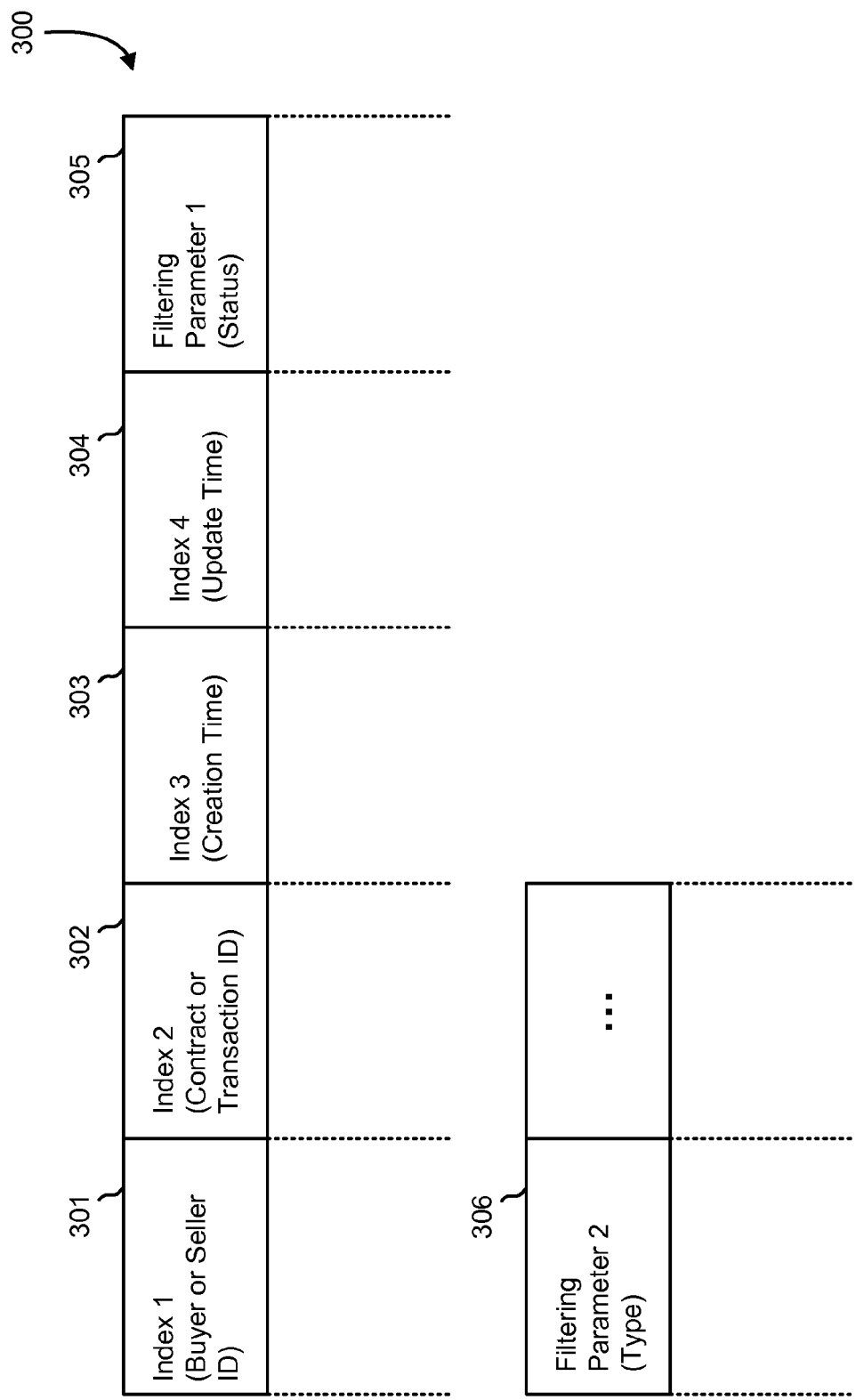
FIG. 3 shows an example of a schema for a table in accordance with at least one embodiment.

FIG. 3 shows an example of a schema for a table in accordance with at least one embodiment. The table 300 has a plurality of indices of which four indices are shown and a plurality of filtering parameters of which two filtering parameters are shown. The four indices are denoted as index 1-4 and referred to herein by the numerals 301-304, respectively. Further, the two filtering parameters are denoted as filtering parameter 1 and filtering parameter 2 and are referenced by the numerals 305, 306, respectively. Each index of the plurality of indices 301-304 may be utilized to capture one or more characteristics associated with an entry of the table 300. The characteristic associated with an entry may be any type of alphanumeric string. In the example of FIG. 3, the first index 301 is used to specify an identity associated with a buyer or a seller, the second index 302 is used to specify an identity associated with a contract or a transaction, the third index 303 is used to specify a creation time associated with the contract or transaction and the fourth index 304 is used to specify an update time associated with the contract or transaction. The plurality of filtering parameters 305, 306 of the table 300 further include a first filtering parameter 305 that specifies a status associated with the contract or transaction. The status may for example be "open" or "closed" and may signify whether the contract or transaction remains open or has been satisfied, respectively. In some embodiments, the status may be represented by one or more bits, whereby each value of the one or more bits may signify a particular contract or transaction status. A second filtering parameter 306 is also included. The second filtering parameter 306 specifies a type of contract or transaction. For example, the type may indicate that the transaction or contract are authorized, refunded or captured. The plurality of filtering parameters 305, 306 may be used to filter the results of any query performed on the entries of the table 300.

It is noted that in various embodiments, the number of indices and filtering parameters associated with the table 300 may vary, whereby the number of indices and filtering parameters described with reference to FIG. 3 is shown to facilitate description. It is also noted that in various embodiments, each index or filtering parameter may be utilized to represent different characteristics of data entries of the table 300.

Queries may be performed on the entries of the table 300, whereby given a specific criterion for the one or more indices matching table entries may be obtained. Further, the type of database utilized to retain the table 300 may influence the type of queries or the complexity of the queries that are performed on the entries of the table 300. For example, if the table 300 is retained by a relational database (such as a structured query language (SQL) database), a great deal of facility may be provided in performing queries on table entries. However, a relational database may be associated with higher operational cost than a non-relational database, such as a NoSQL database. Further, a relational database (such as a structured query language (SQL) database) may not be scaled as efficiently as a non-relational database, whereby as the size of data increases a larger operational burden may be placed on a relational database as compared with a non-relational database.

In some embodiments, it may be desirable for the queries to be based at least in part on parameters associated with two indices. For example, it may be desirable to query a contract or transaction identity based at least in part on one or more buyer identities and one or more creation times (or a range of creation times). Further, it may be desirable to query a contract or transaction identity based at least in part on one or more buyer identities and one or more update times (or a range of update times) as indexed by the fourth index 304. Whereas a SQL database may facilitate the queries, a non-relational NoSQL database may not facilitate the queries due at least in part to the fact that the queries are predicated upon controlling for the parameters associated with three indices of the table 300.

Figure 4:
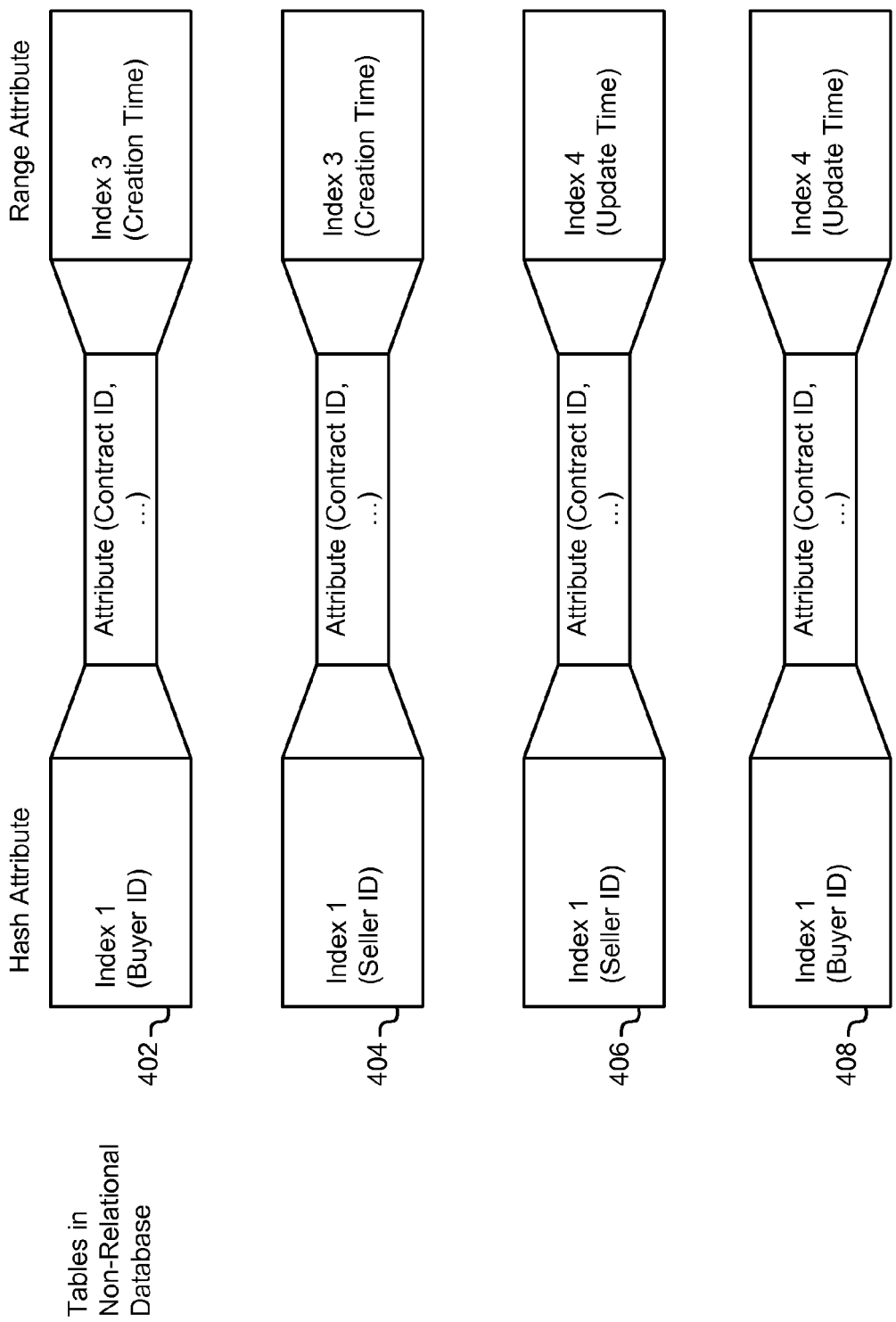
FIG. 4 shows an example of non-relational database tables in accordance with at least one embodiment.

FIG. 4 shows an example of non-relational database tables in accordance with at least one embodiment. The non-relational database tables 402-408 may be used to facilitate performing queries on one or more items in the table 300 described with reference to FIG. 3. A non-relational database table may be a collection of items, whereby each item may be a collection of attributes. Further, as compared to a relational database, where a table has a predefined schema including, among others, a primary key, a plurality of columns and a plurality of data types associated with each column, a table in a non-relational database may not require that all records stored in the table have the same set of columns. Further, individual items stored in a table of a non-relational database may have any number of attributes. An attribute may be any name-value pair, whereby the value may be a single value or a multi-valued set.

The non-relational database tables 402-408 are each associated with a primary key made of two attributes. The first attribute is referred to herein as a hash attribute and the second attribute is referred to herein as a range attribute. Items in the non-relational database tables 402-408 may be queried based at least in part on the two attributes of the primary key. For example, table 402 whose hash attribute is the buyer ID and range attribute is the creation date may be searched based at least in part on a buyer ID and a value or a range for the creation date. The search may yield one or more matching contract identities, the update times associated with the contract identities, a status associated with the contract and a contract type.

Similarly, table 408 whose hash attribute is the buyer ID and range attribute is the update time may be searched based at least in part on a seller ID and a value or a range for the update time. The search may yield one or more matching contract identities, the creation times associated with the contract identities, a status associated with the contract and a contract type.

Accordingly, to render the table 300 described with reference to FIG. 3 searchable on the basis of various indices, one or more non-relational database tables may be created. The one or more non-relational database tables are advantageous in that they are more scalable than a SQL database table. Further, the non-relational database tables are associated with a lower operational cost than a SQL table. As described herein, the first non-relational database table 402 is structured to render the data searchable on the basis of buyer ID and creation time and the second non-relational database table 404 is structured to render the data searchable on the basis of seller ID and creation time. Further, the third non-relational database table 406 is structured so that contract identities are searchable on the basis of seller ID and update time and the fourth non-relational database table 406 is structured so that transaction identities are searchable on the basis of seller ID and update time. It is noted that the number of created non-relational database tables may be increased or decreased depending on the searches that are desired to be made available. For example, the fourth non-relational database table 408 may only be structured if searching contracts on the basis of a buyer ID and update time was sought.

In addition to permitting queries on the basis of a primary key comprised of two attributes, the results of a search conducted on a non-relational database table may be filtered on the basis of any filter parameter, such as status or type.

Figure 5:
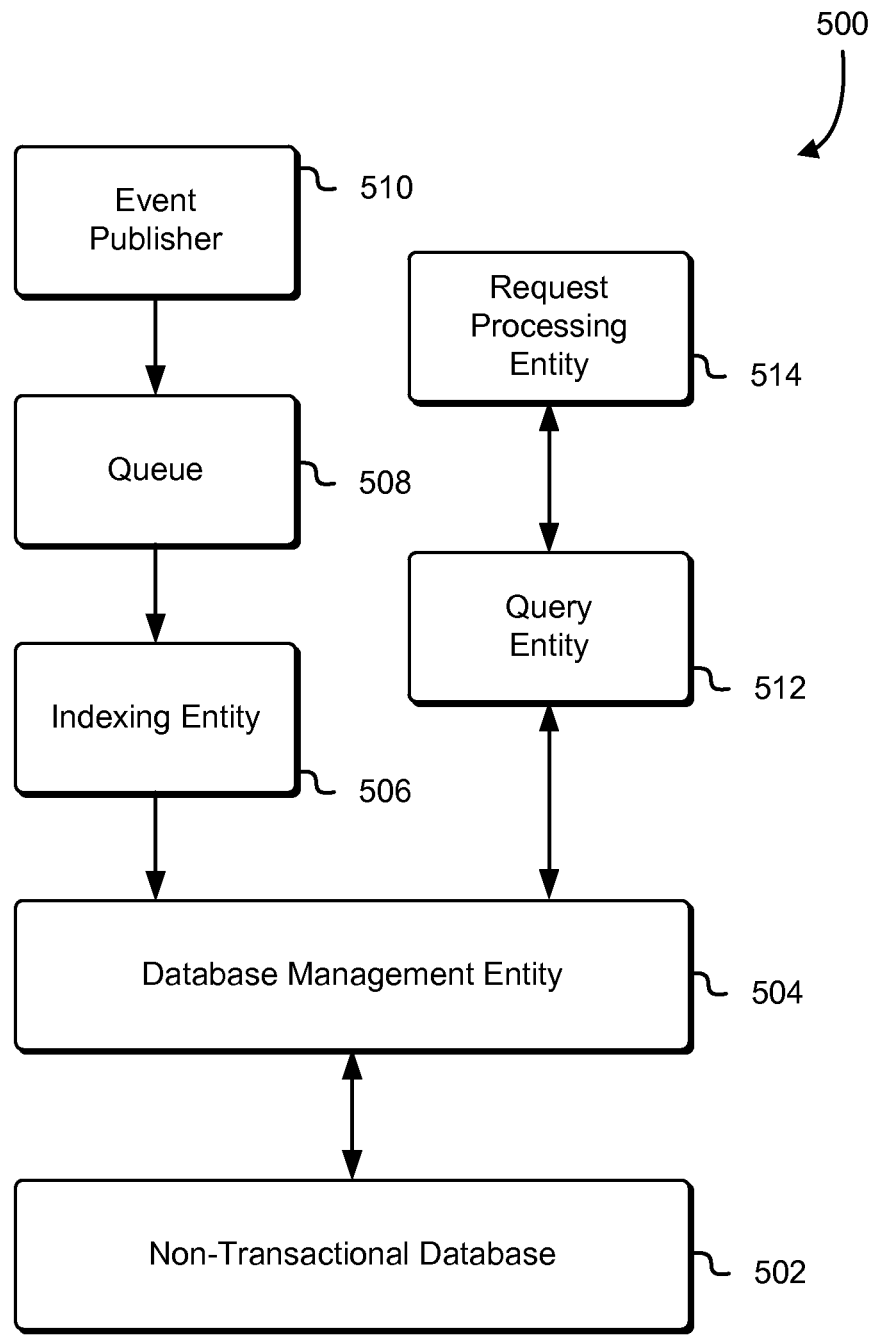
FIG. 5 shows an example of a system for transacting with a NoSQL database in accordance with at least one embodiment.

FIG. 5 shows an example of a system for transacting with a NoSQL database in accordance with at least one embodiment. The system 500 includes a non-transactional database 502 that may be used to maintain searchable tables based at least in part on a hash attribute and a range attribute. As described herein, the searchable tables may be created in accordance with the search requirements of the system 500. The system 500 also includes a database management entity 504, which may be executed as a process running on a computer system, that queries the non-transactional database 502 and provides query results to a requesting party. Further, the database management entity 504 may enable creating one or more database table and updating the data in any one of the database tables by, for example, adding one or more attributes to the tables. For example, the database management entity 504 may enable creating or updating indices for one or more tables of the non-transactional database 502. As described herein, the database management entity 504 further facilitates handling conflicts of records having the same timestamp.

The system 500 includes an event publisher 510. The event publisher 510, which may be implemented as a process running on a computer system, enables publishing indexing events for contracts or transactions when a state update occurs. The state update may be due to a change in an attribute associated with a contract or a transaction that is part of a database table. Further, if a new contract or transaction is added for a buyer or a seller, the event publisher 510 enables the attributes associated with the contract or transaction (for example, contract or transaction identity, creation time, update time, type or status) to be published in the database table. As described herein, an event may be any addition, deletion or modification to any attribute associated with a contract or transaction. When publishing an event, the event publisher 510 may enqueue the event in a queue 508 provided by a queue service. Further, a notification service may be used to notify the queue of a published event, whereby the queue may be subscribed to the notification service and the notification service may notify the queue of events that are added to the queue. Further, error handling may also be employed for resolving exceptions. In some embodiment, events may be enqueued in more than one queue. For example, a first queue may be used for state updates pertaining to contracts and a second queue may be used for state updates pertaining to transactions.

The indexing entity 506, which may be executed as a process running on a computer system, may include event handling logic that receives events from the queue 508 and communicates with the database management entity 504 to cause one or more indices corresponding to the event to be created or updated. In some embodiments, the indexing entity 506 may include two or more event handler (for example, a first event handler may be associated with a first queue used for state updates pertaining to contracts and a second event handler may be associated with a second queue used for state updates pertaining to transactions). The indexing entity 506 may also include logic dedicated to error handling as described herein.

The request processing entity 514 and the query entity 512 are configured to enable submitting queries directed to tables of the non-transactional database 502 and providing one or more results of the queries to a requesting party. The request processing entity 514 may receive requests for query searches from a user or a service. A request may be submitted to the request processing entity 514 using an appropriately configured application programming interface (API) function call. Further, a user interface (UI) may be provided to enables a user (for example, a buyer or a seller) to submit one or more requests to the request processing entity 514. For example, a seller may be provided with a seller UI using which the seller may submit queries to search for contracts or transactions associated with the seller based at least in part on the identity of the seller.

The query entity 512 may be configured to evaluate a received query request and communicate the request to the database management entity 504 in order to retrieve a search result associated with the query from the non-transactional database 502. The query entity 512 may also enable paginating query results, whereby one page of query results may be retrieved at one time. The page size for a query may be specified in the query request or may be otherwise specified. Further, pagination may enable limiting the number of table names included in one page of results. When search results are paginated, tokens may be employed to ensure that a user may receive subsequent pages of search results. For example, after a page of search results is retrieved, a token may be provided to specify the starting of a subsequent page of search results.

Figure 6:
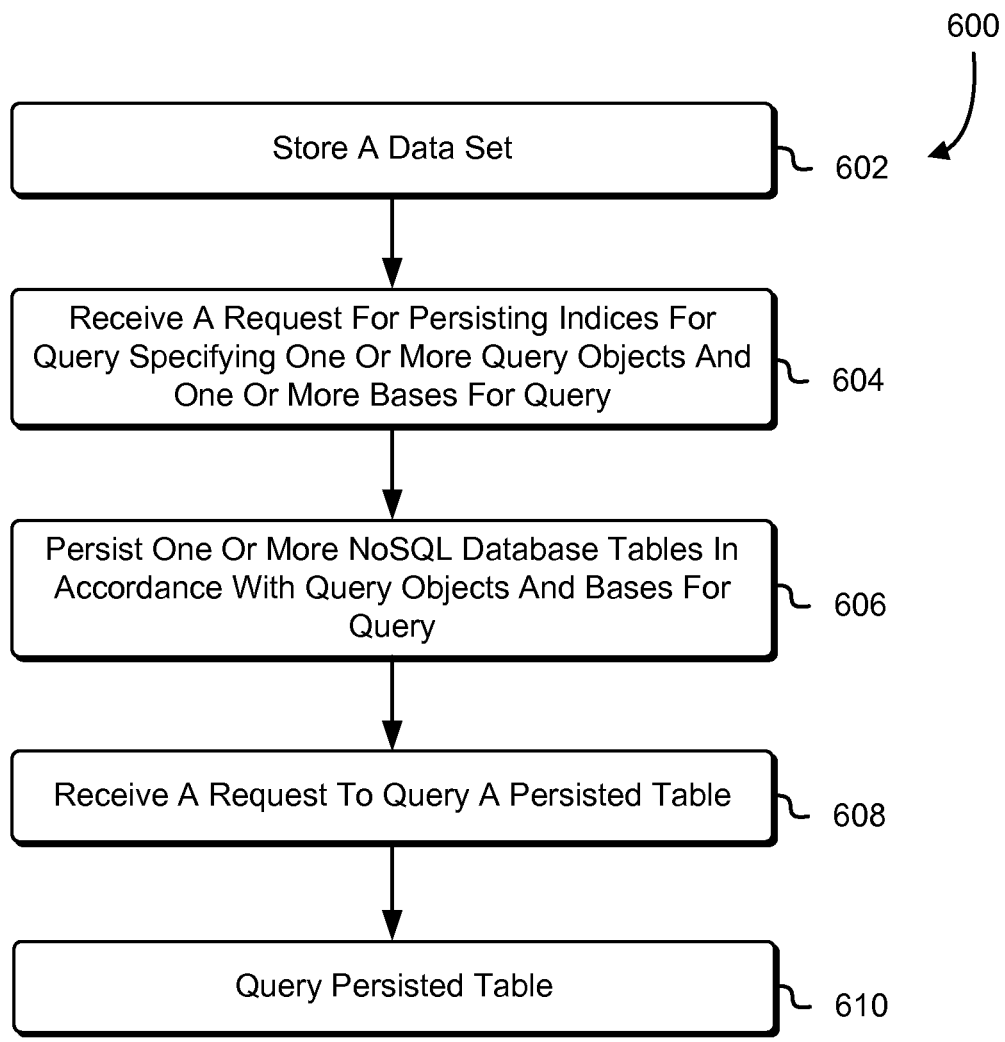
FIG. 6 shows an example of a method for persisting a NoSQL database table in accordance with at least one embodiment.

FIG. 6 shows an example of a method for persisting a NoSQL database table in accordance with at least one embodiment. In the process 600, a database service stores 602 a data set, which may be a primary data set. The data set may by any type of user data, such as the table of user data described with reference to numeral 300 in FIG. 3. The data set may have a plurality of columns (also referred to herein as indices) and each column may be associated with one or more data items. For example, the data set may include one or more columns for buyer or seller ID, contract or transaction ID, creation time, update time, status or type. Further, the data set may be populated with information for each column. The data set may have been originally transferred to the database service from another entity (for example, to render the data set searchable). Further, the data set may have been built over time in the database service as items are added to the data set. In addition, the data set may be the result of both a data transfer and the addition of items over time.

A database management entity receives 604 a request for persisting indices for query. The request for persisting indices for query may specify one or more query objects and one or more bases for query. The one or more query objects may indicate data set entries or columns that a user seeks to query. For example, the user may seek to query contract or transaction identities and, may, accordingly specify that the contract or transaction identities column is the query object sought for the data set. The object for query may be part or the query result provided to a user. The one or more bases for query may specify one or more data set indices that form one or more query criteria. Further, the one or more bases for query may be query constraints provided by the user in order to be obtain a query object. For example, the basis for query may be specified as a buyer or seller ID and update time, whereby the user may seek to query a contract or transaction identity based at least in part on the provided buyer or seller ID and update time.

The database management entity persists 606 one or more NoSQL database tables in accordance with the query object and bases for query. As described herein, the one or more NoSQL database tables may be constructed such that the primary key may be made of one or more bases for query. Further, a secondary index may be created for the query object. After the one or more NoSQL database tables, the database management entity receives 608 a request to query a persisted table. The database management entity then queries 610 the persisted table based at least in part on the received request.

Figure 7:
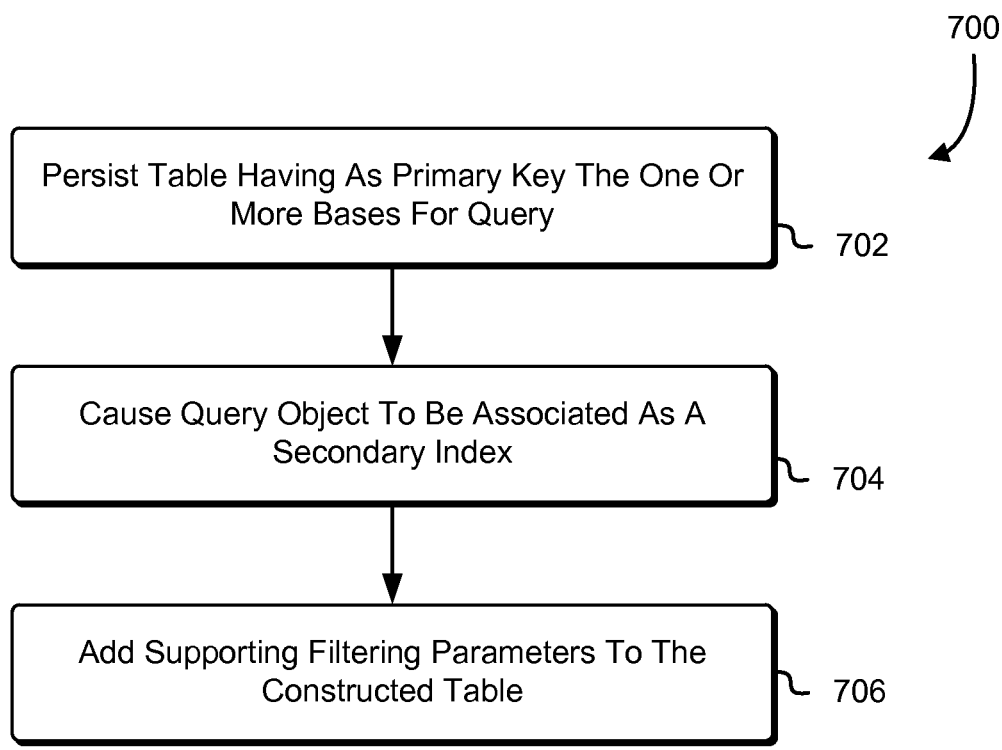
FIG. 7 shows an example of a method for creating a NoSQL database table in accordance with at least one embodiment.

FIG. 7 shows an example of a method for creating a NoSQL database table in accordance with at least one embodiment. In the process 700, the database management entity persists 702 a table having as primary key the one or more bases for query. For example, if the user seeks to use both the buyer ID and creation time as the bases for queries, the primary key for the persisted table may have the buyer ID as a hash attribute and the creation time as a hash range. The table may be populated in accordance with the data retrieved from the data set. Further, if more than one bases for query are sought, the index adapter may construct more than one table as described herein. For example, as described with reference to FIG. 4, four tables may be created to facilitate various queries.

The database management entity then causes 704 the query object to be associated as a secondary index for the table. As a secondary index, the query object may be provided as a result of searches performed on the primary key. The database management entity also adds 706 supporting filtering parameters to the constructed table. For example, contract or transaction type and contract or transaction status may be added to the table as filtering parameters and be used to filter search results of secondary index data.

Following the creation of one or more tables in accordance with at least one embodiment described herein, the index adapter may cause the tables to be updated. The index adapter may receive data that is sought to be added to the data set, such as the creation of an entry for a new contract, and may add the data to the tables. When more than one table are maintained, updating the tables may be coordinated.

Further, mechanisms for handling conflicts in the data may be employed to guarantee data integrity. Conflict handling may be based at least in part on distinguishing matching data entries, whereby, for example, matching data entries may be entries that have identical values or representations. By way of example, two contracts that are created at the same time may have identical creation time entries. As described herein, matching data entries may be distinguished by appending each data entry with a value or a representation that is different from the remaining data entries.

In some embodiments, a creation time or update time for a contract or transaction for a buyer or a seller may be recorded in units of milliseconds (ms) with respect to a time reference. For example, a contract or a transaction that is created one day after the time reference may have a creation time of 86400000. To avoid having two or more contracts or transactions with the same creation time two digits may be appended to the creation time to distinguish the records. The data may be examined to determine the number of matching data entries and the data entries may be appended in order to distinguish the data.

Figure 8:
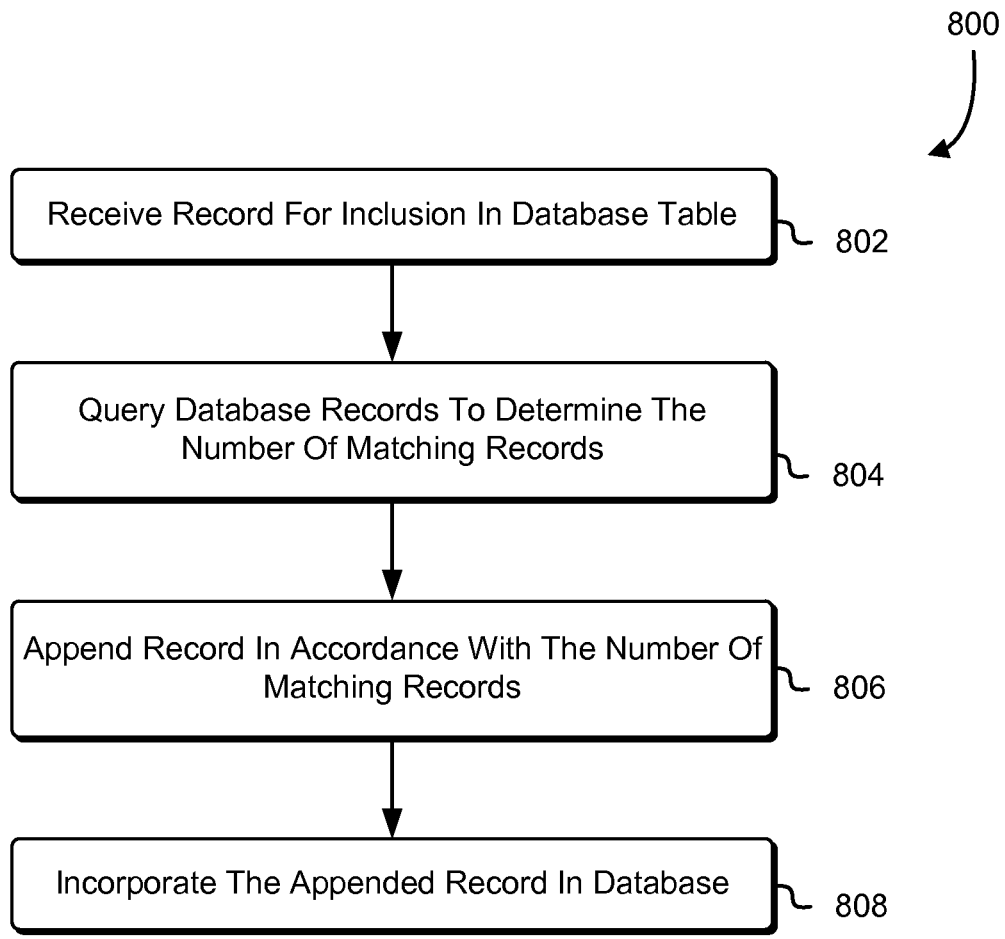
FIG. 8 shows an example of a method for distinguishing records in accordance with at least one embodiment.

FIG. 8 shows an example of a method for distinguishing records in accordance with at least one embodiment. In the process 800, a database management entity receives 802 a record for inclusion in a database table (the record may belong to a primary index of the table). The record may potentially be in conflict with an existing record of the database, whereby the database management entity may be configured to append the record (for example, using one or more digits) to distinguish the record from the existing record. The database management entity queries 804 the database to determine the number of matching records in the database. The query may be designed to yield records that are appended to be distinguished from matching records. For example, if the database management entity resolves record conflicts by appending two digits to a record, the database may be searched for all matching records that are appended with values between 00 and 99 in order to yield all matching records.

The database management entity then appends 806 the received record in accordance with the number of matching records. For example, if three matching records are found and the index adapter appends the records with two digit numbers that are assigned consecutively, the index adapter may append the received record with the digits 03 to distinguish the record from the existing records that are appended with the digits 00, 01 and 02. On the other hand, if no matching records are found, the database management entity may append the record with the digits 00. The database management entity then incorporates the appended record in the database.

In some embodiments, the search query performed to determine the number of matching records may be narrowed so as to limit the number of distinguished records. For example, it may be desirable for all transactions associated with a certain sellers to be distinguished based at least in part on the update time associated with the transactions. Further, it may be acceptable for two transactions that are associated with different sellers to have matching update times. Accordingly, the database management entity may only query matching update times that pertain to the seller and may exclude update times of other sellers.

Figure 9:
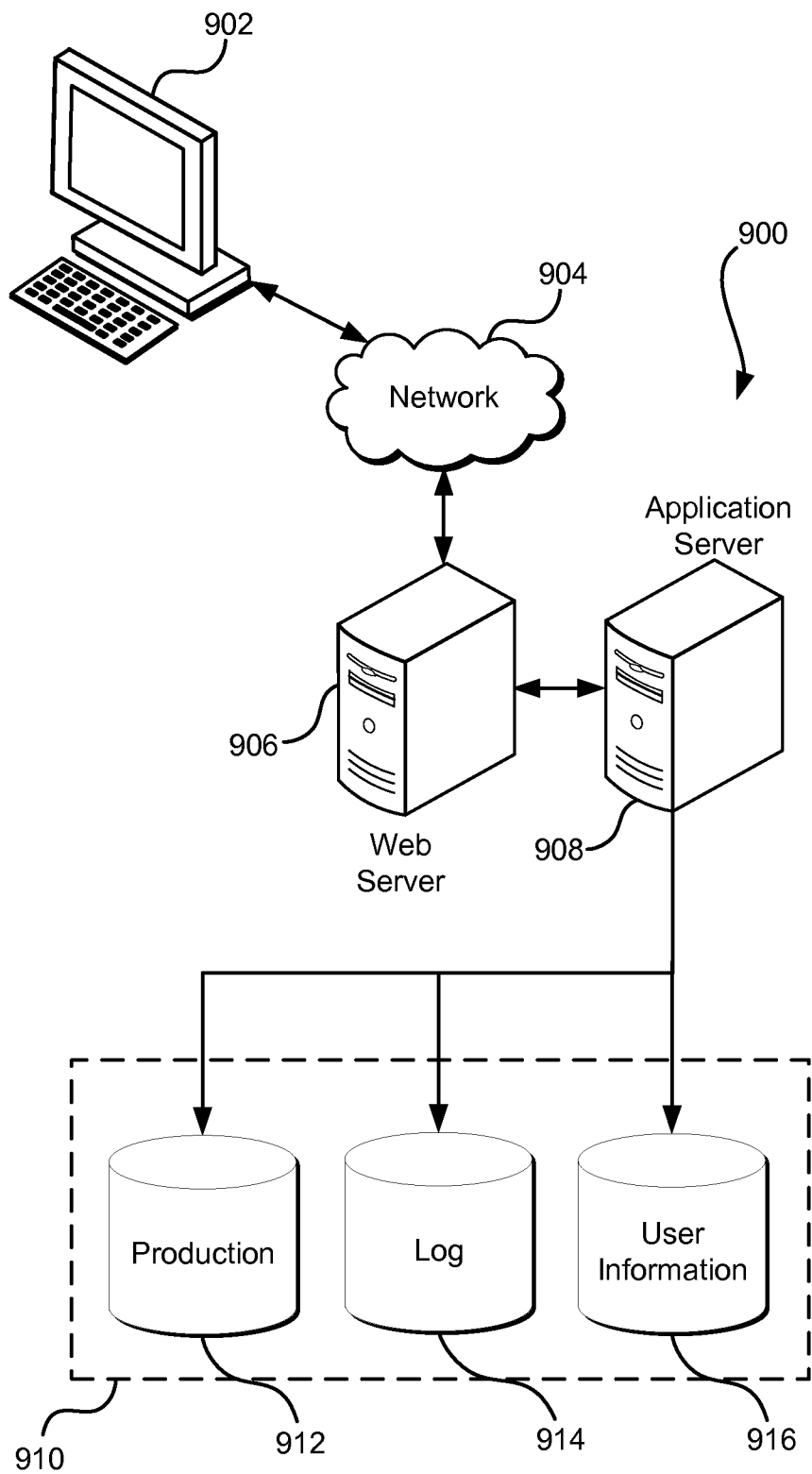
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for searching a data set, comprising:
   under the control of one or more computer systems configured with executable instructions,
   storing a data set, the data set including a plurality of records and being structured according to a plurality of indices, each record of the plurality of records being associated with one or more indices of the plurality of indices;
   receiving a request to create search indices for querying the data set, the request specifying a query object and one or more bases for query for the data set, the query object being a data field to be provided upon execution of the query and being sought to become searchable based at least in part on the one or more bases for query, an individual basis for query of the one or more bases for query being associated with an index of the plurality of indices of the data set;
   constructing a table in a non-transactional database, the table having the one or more bases for query as a primary key and the query object as a secondary index, the primary key of the non-transactional database comprising a hash key and a hash range;
   receiving a request to query the data set, the request specifying one or more records associated with the one or more bases for query; and
   in response to receiving the request:
   identifying the table based at least in part on the one or more bases for query;
   searching the table to yield a record of the secondary index; and
   providing the record of the secondary index.

2. The computer-implemented method of claim 1, wherein:
   the non-transactional database is a NoSQL database; and a first basis for query of the one or more bases for query being assigned as the hash key and a second basis for query of the one or more bases for query being assigned as a range key.

3. The computer-implemented method of claim 2, wherein:
the request to query the data set is an application programming interface (API) function call; and
the request to query the data set specifies a page size limiting a number of records of the secondary index provided in response to the request.

4. The computer-implemented method of claim 1, wherein the secondary index of the table is capable of being filtered according to one or more filtering parameters.

5. The computer-implemented method of claim 1, further comprising:
receiving a request to add a new record to the table; and
on a condition that the new record is determined to match an existing record in the table, appending the new record with one or more characters to distinguish the new record from the existing record.

6. The computer-implemented method of claim 5, wherein:
determining whether the new record is in conflict with the existing record further includes searching the table to determine a number of matching records in the table; and
the one or more characters are sequentially assigned based at least in part on the number of matching records in the table.

7. A system, comprising at least one computing device configured to implement one or more services, the one or more services are configured to:
receive a plurality of query pairs, a query pair of the plurality of query pairs including a query object for a data set and one or more bases for query for the data set, the data set being organized according to a plurality of indices, the query object being associated with an index of the plurality of indices and the one or more bases for query are associated with one or more indices of the plurality of indices; and
for the query pair of the plurality of query pairs:
create a table for the data set in a NoSQL database, the table being searchable based at least in part on one or more records of the one or more bases for query for the query pair, the table having a primary key comprising a hash key and a hash range; and
cause the table to be searched to yield a yielded record, the yielded record belonging to the query object of the query pair.

8. The system of claim 7, wherein a first basis for query of the one or more bases for query is set as the hash key and a second basis for query of the one or more bases for query is set as the hash range.

9. The system of claim 7, wherein the query object of the created table is a secondary index of the created table.

10. The system of claim 7, wherein the system is further configured to:
receive application programming interface (API) function call requesting the data set to be searched, the API function call specifying the one or more records of the one or more bases for query; and
identify the table to be searched based at least in part on the one or more bases for query.

11. The system of claim 7, wherein the system is further configured to:
filter the yielded record based at least in part on one or more filtering parameters; and
provide the filtered yielded record as a query result.

12. The system of claim 7, wherein the system is further configured to:
receive a request to add a new record to the data set; and
cause the new record to be added to the created table.

13. The system of claim 12, wherein
the system is further configured to determine whether the new record matches an existing record in the table; and
causing the new record to be added to the table further includes:
appending the new record with one or more characters to distinguish the appended new record from the existing record; and
adding the appended new record to the table.

14. A non-transitory computer-readable storage medium having collectively stored thereon executable instructions that, when executed by one or more processors of a computer system, cause the computer system to at least:
store a data set, the data set being searchable based at least in part on a plurality of indices associated with the data set;
for at least one pair of indices of the plurality of indices, create a table in a non-transactional database for the data set, the table being populated by records of the data set and the table being searchable based at least in part on the pair of indices, the table having a primary key comprising a hash key and a hash range;
receive a request to query the table, the request specifying, for an index of the pair of indices, a record associated with the index; and
in response to the request:
identify the table based at least in part on the pair of indices; and
search the table to yield a resulting record, the resulting record belonging to an index of the plurality of indices that is different than the pair of indices.

15. The non-transitory computer-readable storage medium of claim 14, wherein:
the non-transactional database is a NoSQL database; and
a first index of the at least one pair of indices is assigned as the hash key and a second index of the at least one pair of indices is assigned as the hash range.

16. The non-transitory computer-readable storage medium of claim 14, wherein the instructions that cause the computer system to receive the request to query the table further include instructions that cause the computer system to:
receive an application programming interface (API) function call to query the table; and
the API function call specifies a limit on a number of the resulting records provided in response to the request.

17. The non-transitory computer-readable storage medium of claim 14, wherein the instructions further comprise instructions that, when executed by the one or more processors, cause the computer system to:
filter the resulting record based at least in part on one or more filtering parameters; and
provide the filtered resulting record as a query result.

18. The non-transitory computer-readable storage medium of claim 14, wherein the instructions further comprise instructions that, when executed by the one or more processors, cause the computer system to:
receive a request to add a new record to the data set; and
cause the new record to be added to one or more tables associated with the data set.

19. The non-transitory computer-readable storage medium of claim 18, wherein the instructions that cause the computer system to cause the new record to be added to the one or more tables further include instructions that cause the computer system to:
- search a table of the one or more tables to determine whether the new record is in conflict with an existing record; and
- on a condition that the new record is in conflict with the existing record, append one or more characters to the new record to distinguish the new record from the existing record.

20. The non-transitory computer-readable storage medium of claim 19, wherein the instructions that cause the computer system to append the one or more characters to the new record further include instructions that cause the computer system to:
- determine a number of matching records in the table;
- sequentially assign a number to the new record based at least in part on the number of matching records in the table; and
- append the new record with the sequentially assigned number.

* * * * *